United States Patent [19]

Mori et al.

[11] Patent Number: 4,818,307
[45] Date of Patent: Apr. 4, 1989

[54] DISPERSION STRENGTHENED COPPER-BASE ALLOY

[75] Inventors: Kazuhiko Mori, Toyota; Katsuhiko Ueda, Aichi; Soya Takagi; Minoru Kawasaki, both of Toyota, all of Japan

[73] Assignee: Toyota Jidosha Kabushiki Kaisha, Toyota, Japan

[21] Appl. No.: 133,620

[22] Filed: Dec. 16, 1987

[30] Foreign Application Priority Data

Dec. 19, 1986 [JP] Japan .................. 61-303176

[51] Int. Cl.$^4$ .................. C22C 9/02; C22C 9/06
[52] U.S. Cl. .................. 148/414; 148/435; 428/614; 420/487; 420/486
[58] Field of Search .......... 148/414, 435; 420/486, 420/487, 488, 490; 428/614

[56] References Cited
FOREIGN PATENT DOCUMENTS
29449 9/1973 Japan .................. 420/486

Primary Examiner—L. DeWayne Rutledge
Assistant Examiner—George Wyszomierski
Attorney, Agent, or Firm—Finnegan, Henderson, Farabow, Garrett & Dunner

[57] ABSTRACT

Herein disclosed is a dispersion strengthened copper-base alloy having an excellent wear resistance, which alloy contains 5 to 30% (in weight) of nickel, 1 to 5% of silicon, 0.5 to 3% of boron and 4 to 30% of iron, the remainder being copper and unavoidable impurities, and having a structure in which hard particles composed chiefly of a silicide of iron-nickel system are dispersed in a copper-base matrix. The copper-base alloy is suitably cladded (or deposited) locally on a metallic base. The alloy may contain at least one of 0.1 to 5% of aluminum, 0.1 to 5% of Ti and 1 to 10% of Mn, if necessary, in addition to the above specified components. If necessary, 0.02 to 2% of carbon and 0.5 to 10% of chromium and/or 0.3 to 5% of titanium may be further added. Then, the structure is modified such that both the particles composed chiefly of the iron-nickel silicide and carbide particles are coexistently dispersed in the copper-base matrix.

4 Claims, 6 Drawing Sheets

DISPERSION STRENGTHENED COPPER-BASE ALLOY

BACKGROUND OF THE INVENTION

The present invention relates to a Cu(copper)-base alloy having excellent wear resistance and, more particularly, to a dispersion strengthened Cu-base alloy which is suited for forming a wear resisting layer locally on a metallic base.

Some wear resisting Cu-base materials are heretofore known, including precipitation hardened alloys such as beryllium(Be)-Cu alloys made by adding about 2% of Be to Cu or Cu-Ni(nickel)-Si(silicon) alloys known as the Corson alloy. Other known Cu-base materials are dispersion strengthened alloys which are made by dispersing in a Cu-base matrix dispersion phase particles composed chiefly of hard oxides of Si(silicon), Cr(chromium), Be, Ti(titanium), Zr(zirconium), Mg (magnesium) or Mn(manganese) such as $SiO_2$, $Cr_2O_3$, BeO, $TiO_2$, $ZrO_2$, MgO or MnO. The former Cu alloys of the precipitation hardened type are made by precipitating intermediate phases or inter-metallic compounds from the matrix and hardening them through an aging treatment for a long time after a solution heat treatment. On the other hand, the process of making the latter alloys of the dispersion strengthened type is represented by a sintering process in which powder of Cu or its alloy for the matrix and powder of an oxide for the dispersion phase are sintered after they have been mixed and compressed. In another representative process, a material prepared by adding to Cu or its alloy for the matrix a metal more oxidizable than Cu or its alloy and holding the same at a high temperature in an oxidizing atmosphere to diffuse the oxidizing gases inside thereby to generate an oxide phase.

It takes a long time for the precipitation hardened alloy to diffuse in a solid to produce the aging precipitation. This requires an accordingly long treatment at a high temperature which causes problems. For example, the precipitation hardened alloy is difficult to use as a material for large-sized parts and is liable to be subject to strains. In another aspect, the particles to be precipitated in this alloy are as small as several microns at most. No matter how hard they might be, sufficient wear resistance especially resistance to sliding wear cannot be obtained. Better sliding wear resistance will be obtained if the dispersed hard particles have a larger diameter (e.g., 10 to 100 μm). This diameter range is difficult to achieve in the precipitation hardened alloy.

On the other hand, one type of these dispersion strengthened alloys, which is made by the internal oxidation process, is accompanied by solid phase diffusion for generation of the dispersion phase particles. The alloy of this type also requires a long treatment at a high temperature so that it is difficult to apply to large-sized parts and also is not free from strains. The dispersion strengthened alloy made by the sintering process can freely achieve the desired diameter of the dispersion phase particles but requires compression and sintering of the whole material. This makes it difficult to form the dispersion strengthened alloy locally in a member.

SUMMARY OF THE INVENTION

The present invention has been conceived in view of the background thus far described and has an object to provide a wear resisting Cu-base dispersion strengthened alloy which is remarkably excellent in wear resistance especially to sliding wear and which can be formed simply and easily in a selected portion of the metallic bases of large or small parts by a depositing treatment, that is, a deposit welding or cladding-by-buildup welding treatment.

The Cu-base dispersion strengthened alloy according to a major feature of the present invention contains, in weight percent, 5 to 30% of Ni, 1 to 5% of Si, 0.5 to 3% of B and 4 to 30% of Fe(iron), the remainder being Cu and unavoidable impurities, and has a structure in which hard particles composed chiefly of a silicide of Fe-Ni system are dispersed in a Cu-base matrix.

The Cu-base dispersion strengthened alloy according to another feature of the present invention contains, as its overall composition, at least one of 0.1 to 5% of Al (aluminum), 0.1 to 5% of Ti and 1 to 10% of Mn in addition to the above-specified Ni, Si, B, Fe and Cu, and has a similar structure.

The Cu-base dispersion strengthened alloy according to still another feature of the present invention contains 0.02 to 2% of C, and at least one of 0.5 to 10% of Cr and 0.3 to 5% of Ti in addition to the above-specified Ni, Si, B, Fe and Cu, and has a structure in which hard particles of a carbide are dispersed in the Cu-base matrix coexistently with the hard particles composed chiefly of the silicide of the Fe-Ni system.

The Cu-base dispersion strengthened alloy according to a further feature of the present invention has a structure in which the hard particles are further composed of a boride of Fe-Ni system in the complex form with the silicide.

DETAILED DESCRIPTION OF THE INVENTION

Figure 1:
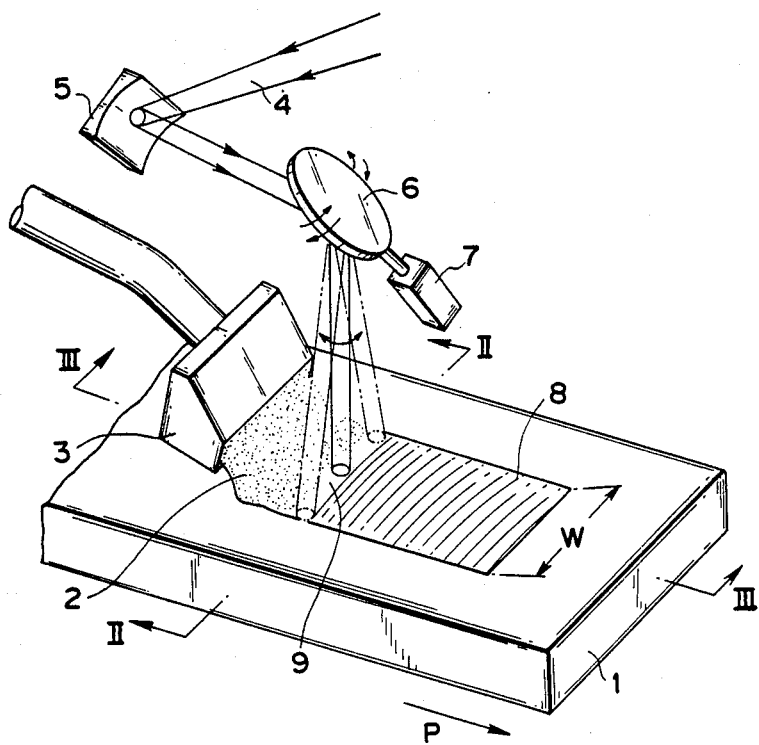
FIG. 1 is a schematic perspective view showing one example of a process for deposit welding the Cu-base dispersion strengthened alloy of the present invention to a metallic base by means of a laser beam.

The dispersion strengthened Cu-base alloy according to the present invention can be made without difficulty by a depositing (or cladding) treatment on a metallic base with a heating energy of high concentration such as the laser beam, a TIG arc, a plasma arc or an electron beam, as will be described in detail. In a Cu-base matrix having a hardness of about 150 to 250 Hv, structurally speaking, there are substantially uniformly dispersed hard particles having a hardness of about 700 to 1,200 Hv, namely, either particles of chemical compounds of Si (i.e., silicides) with Fe, Ni and so on or particles of a complex of those silicides and chemical compounds of B (i.e., borides) with Fe, Ni and so on. The dispersion particles have a size ranging from 5 μm to 1,000 μm and an area percentage of 2 to 30%. Thus, the hard particles composed chiefly of the silicides of the Fe-Ni system are dispersed to provide a remarkably excellent wear resistance especially to sliding wear. In the case of the Cu-base dispersion strengthened alloy to which are added C and Cr and/or Ti, hard carbide particles are dispersed coexistently with the above-specified particles composed chiefly of the Fe-Ni silicides to further improve the wear resistance.

The reasons for limiting the composition of the present invention will be described in the following.

Ni:

Nickel is an element necessary for strengthening the Cu-base matrix and forming the hard silicides or borides of Fe-Ni system. Less than 5% of Ni will not be sufficient to effect strengthening of the matrix. If the content of Ni exceeds 30%, the weldability to the metallic base, especially to the base of an aluminum alloy, is so degraded that the object of improving the wear resistance locally by the deposition of the metallic base may not possibly be achieved. Hence, the range of Ni content is set 5 to 30%.

Si:

Silicon is an element necessary for forming the Fe-Ni silicides for the hard particles and performs the role of strengthening the Cu-base matrix. The hard particles of silicides are not formed with the Si content being less than 1%, and cracks are liable to form upon deposition to the metallic base with the Si content being more than 5%. Hence, the range of Si content is set 1 to 5%.

B:

Boron is an element effective to generate borides to produce a hard particles in the complex form with the above-specified silicides and performs the role of strengthen the Cu-base matrix. These effects cannot be achieved to a sufficient extent with the B content being less than 0.5%. In excess of 3%, on the other hand, cracks are also liable to form upon deposition on the metallic base. Hence, the range of B content is set 0.5 to 3%.

Fe:

Iron is an element which will hardly dissolve into the Cu-base matrix solidly and a major element for forming the silicides or borides of the Fe-Ni system as the hard particles. Below 4%, a sufficient amount of the dispersion of the hard particles cannot be formed. Over 30%, the weldability to the metallic base, especially to the aluminum alloy base will be deteriorated. Hence, the range of Fe content is set 4 to 30%.

In addition to the elements specified above, the remainder may be Cu and unavoidable impurities. If necessary, however, at least one of 0.1 to 5% of Al, 0.1 to 5% of Ti and 1 to 10% of Mn is added to the components Ni, Si, B, Fe and Cu. By this addition, it is possible to improve the strength of the Cu-base matrix phase and the dispersion phase. The ranges of these additions are set, as above, because the desired effects cannot be attained below these limits and the toughness will drop above these limits.

In the Cu-base dispersion strengthened alloy of the present invention, at least one of 0.5 to 10% of Cr and 0.3 to 5% of Ti is added, if necessary, together with 0.02% to 2% of C to the above-specified elements Ni, Si, B, Fe and Cu. By this addition, not only the particles composed chiefly of the silicides of the Fe-Ni system but also carbides can be generated as hard particles to improve the wear resistance. With the contents of Cr less than 0.5%, Ti less than 0.3% and C less than 0.02%, the effect of improving the wear resistance is worse than that of base Cu-Ni-B-Si-Fe alloy. With the contents of 10% of Cr, 5% of Ti and 2% of C or more, on the other hand, the toughness is degraded as well as the depositability to the metallic base, especially to the aluminum alloy base. Thus, the amounts of Cr and/or Ti and C added are set within the above-specified ranges.

Specific requisites for the present invention will be described in the following.

The Cu-base dispersion strengthened alloy of the present invention can be easily formed by depositing it on a selected metallic base such as an aluminum alloy, steel or cast iron by means of a highly concentrated heating energy such as a laser beam, a TIG arc, an electron beam or a plasma arc. Specifically, the powder of either an alloy having a composition for making the Cu-base dispersion strengthened alloy or a mixture having the composition of the alloy as a whole is quickly melted on the surface of that location of a metallic base of an aluminum alloy or the like, which is to have its wear resistance improved. This is achieved by irradiating the powder with the highly concentrated heating energy such as a laser beam either after having been arranged in advance on that surface or while being fed to the surface. The melt is then quenched to it and is metallurgically bonded to the metallic base by either moving the irradiation position of the highly concentrated heating energy or interrupting the irradiation.

A specific example of the process for forming the Cu-base dispersion strengthened alloy of the present invention on the metallic base through deposition using the laser beam will be described with reference to FIGS. 1 to 3.

Figure 2:
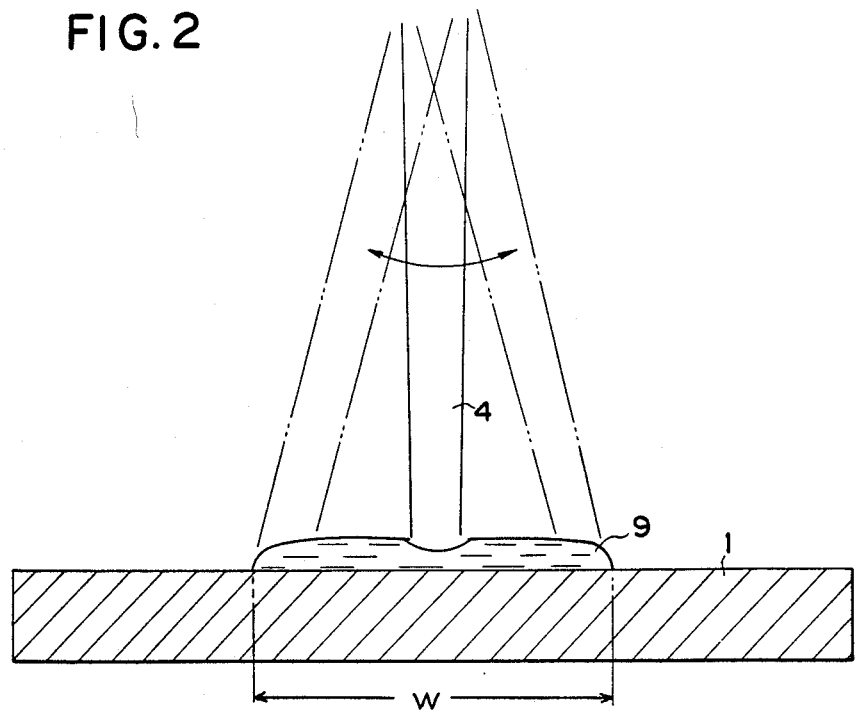
FIG. 2 is an enlarged section taken along line II—II of FIG. 1.
Figure 3:
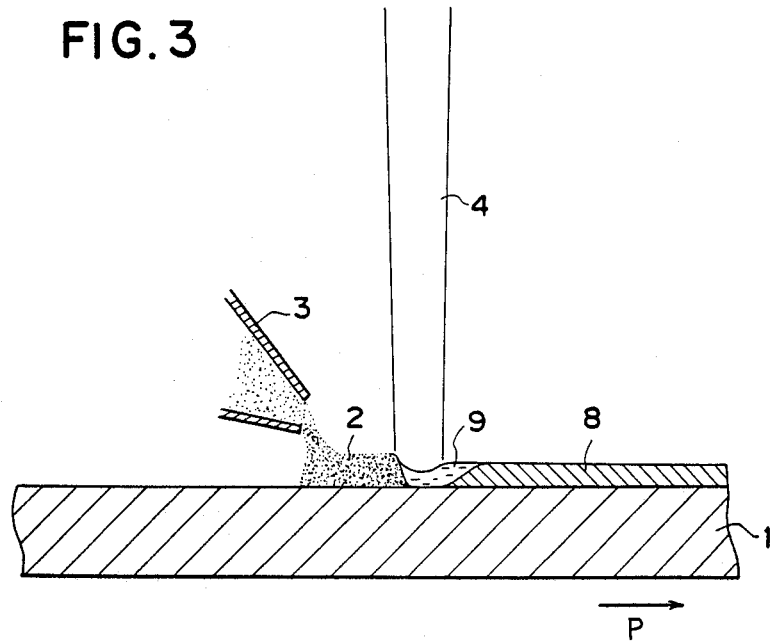
FIG. 3 is an enlarged section taken along line III—III of FIG. 1.

As shown in FIGS. 1 to 3, a metallic base 1 is continuously moved at a velocity of 450 to 2,000 mm/min in the rightward direction of arrow P. On to this metallic base 1 is continuously fed from a hopper (not shown) by way of a powder feed pipe 3 powder 2 of either an alloy for finally forming the deposited layer of the Cu-base dispersion strengthened alloy of the present invention or a powder mixture thereof. The powder thus fed has a width W taken at a right angle with respect to the moving direction P of the metallic base 1. A laser beam 4 emitted from a source (not shown) is returned by a return mirror 5 and reflected by an oscillating mirror 6 to irradiate the powder 2 on the metallic base 1. The laser beam 4 is concentrated to have a diameter of 0.5 to 5.0 mm and an energy concentration of $1 \times 10^2$ to $2 \times 10^4$ W/mm². The oscillating mirror 6 is vibrated within a predetermined angular range by a vibrating mechanism 7 such as a galvanometer so that the laser beam 4 to be focused at the powder 2 on the metallic base 1 is reciprocated (or oscillated) with a frequency of 10 to 500 Hz in a direction perpendicular to the moving direction P of the metallic base 1, i.e., in the direction of the width W of the powder 2 on the metallic base 1.

The powder 2 on the metallic base 1 is melted, when irradiated with the laser beam 4, into a melt 9. This melt 9 is then agitated by oscillating the laser beam 4. When this agitated melt 9 is subsequently brought out of the position of irradiated with the laser beam 4 as the metallic base 1 moves in the direction P, it is quenched to solidify it into a deposited layer 8 formed of the aforementioned Cu-base dispersion strengthened alloy.

Here, in the state where the alloy or powder mixture 2 on the metallic base 1 is quickly melted by the radiation with the laser beam 4, the melt 9 is in a multi-liquid phase in which its two or more liquid phases are separated into the alloy for a Cu-base matrix and a dispersion phase. If the melt 9 in this multi-liquid phase is agitated by oscillating the laser beam, the two or more liquid phases are left separate as if oil were agitated in water. Then, the liquid phase for forming dispersion phase particles finally is uniformly dispersed in a state of generally round particles in the liquid phase for the matrix. When, in this state, the melt 9 is caused to solidify by the relative (scanning) movements between the laser beam and the metallic base, the phase for the dispersion phase solidifies while being uniformly dispersed in the matrix. As a result, the metallic base 1 is formed thereon with the deposited layer 8 composed of the Cu-base dispersion strengthened alloy of the present invention, in which the particles composed chiefly of the silicides of the Fe-Ni system and the particles of carbides are dispersed in the Cu-base matrix.

In the Cu-base dispersion strengthened alloy of the present invention, the liquid phase for the dispersion phase solidifies, as it is, from the state of separate multi-liquid phase to form the dispersion phase particles in the matrix. These dispersion phase particles have far larger diameters, e.g., about 5 to 1,000 $\mu$m or normally about 10 to 200 $\mu$m than those which are formed by the aging precipitation treatment of the prior art. Thus, the dispersion phase particles can exhibit an outstanding wear resistance, as compared with the aging hardened (or aging precipitation) type alloy of the prior art.

Figure 4:
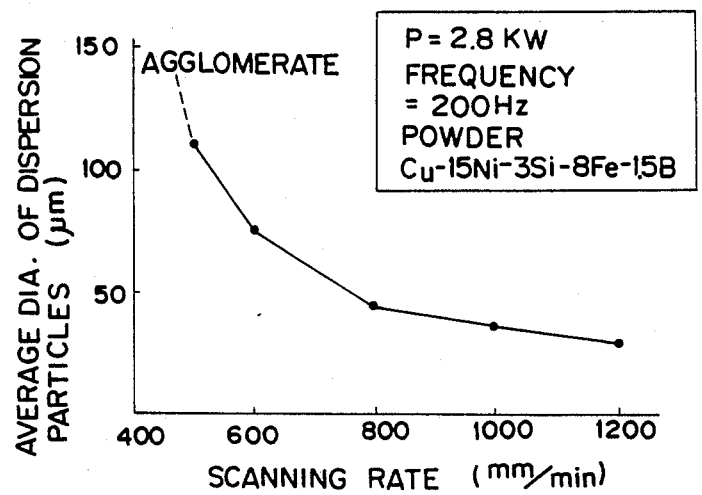
FIG. 4 plots the correlations between the scanning rate of the laser beam in the method shown in FIG. 1 and the diameter of dispersion phase particles.

When the Cu-base dispersion strengthened alloy of the present invention is to be formed on the metallic base by the deposition using the laser beam, the diameter of this dispersion phase particles can be adjusted by adjusting the relative moving velocity (or scanning rate) of the laser beam 4 to the metallic base 1, namely, the bead proceeding velocity (i.e., the moving velocity in the direction P of FIG. 1). FIG. 4 plots the diameters of the dispersion phase particles, which were examined at individual scanning rates of the laser beam, when the Cu-base dispersion strengthened alloy layer 8 having the following composition was formed on the metallic base 1 by the deposition, as shown in FIGS. 1 to 3. The powder to be fed to the metallic base 1 contained the alloy system of Cu-Ni(15%)-Fe(8%)-Si(3%)-B(1.5%), and the experimental conditions were: the laser output of 2.8 KW; the laser beam diameter of 1.5 mm; and the laser oscillation frequency of 200 Hz. It is apparent from FIG. 4 that the dispersion phase particles will be smaller for the higher scanning rate and larger for the lower scanning rate. This is because the amount of heat per unit area to be transferred to the metallic base is less for the higher scanning rate to accelerate the solidification rate.

Figure 5:
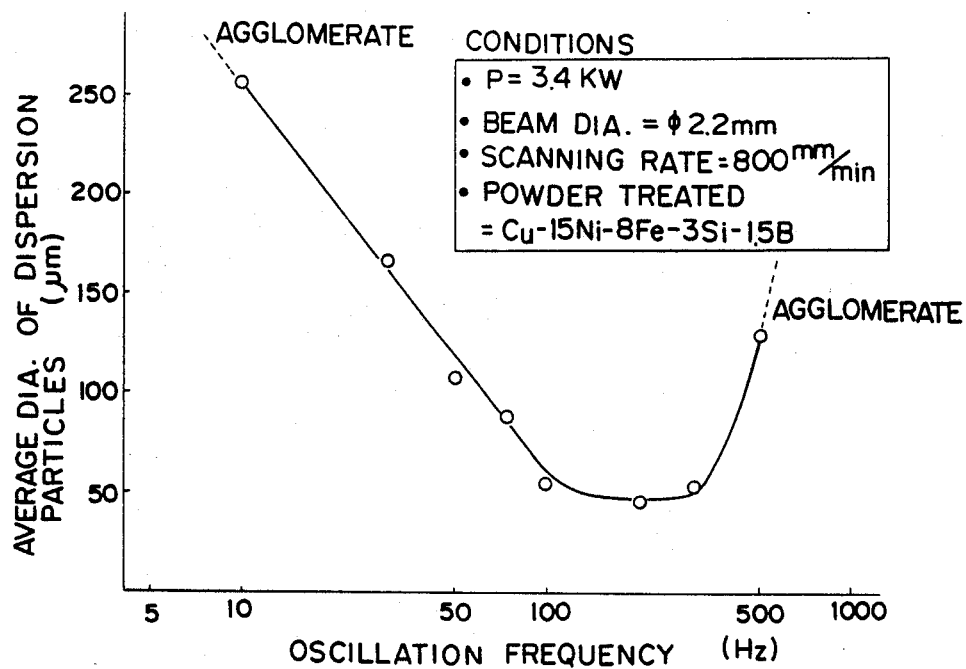
FIG. 5 plots the correlations between the oscillation frequency of the laser beam in the method shown in FIG. 1 and the diameter of the dispersion phase particles.

The diameter of the dispersion phase particles can also be adjusted by adjusting the oscillation frequency of the laser beam. FIG. 5 presents the experimental results of the Cu-base dispersion strengthened alloy layer 8 which was formed on the metallic base by the process shown in FIGS. 1 to 3. The experiments examined the relations between the oscillation frequencies and the diameters of the dispersion phase particles for the various oscillation frequencies of the laser beam. The powder 2 to be fed to the metallic base 1 contained the alloy system of Cu-Ni(15%)-Fe(8%)-Si(3%)-B(1.5%), and the experimental conditions were: the laser output of 3.4 KW; the laser beam diameter of 2.2 mm; and the laser beam scanning rate of 800 mm/min. It is apparent from FIG. 5 that the diameters of the dispersion phase particles will vary in relation to the oscillation frequencies.

Since the diameters of the dispersion phase particles are varied with the variations of the scanning rate and oscillation frequency of the laser beam, as described above, it is possible by setting them at suitable values to form the Cu-base dispersion strengthened alloy layer in which the dispersion phase particles have the optimum diameter for the applications intended and the characteristics demanded.

EXAMPLES

[EXAMPLE 1]

Figure 6:
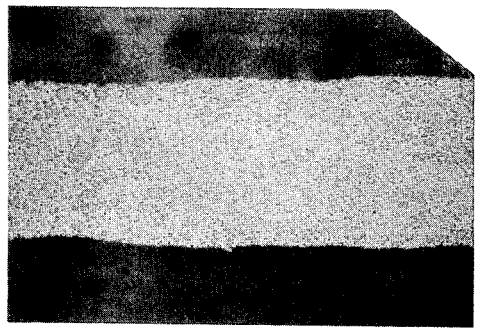
FIGS. 6, 7, 8, 9 and 10 present photographs (of ten magnifications) of the sectional structures of the Cu-base dispersion strengthened alloy layers formed by Examples 1, 2, 3, 4 and 5, respectively.

An alloy powder having a composition of Cu-Ni(15%)-Si(3%)-B(1.5%)-Fe(8%) was deposited on a metallic base of the aluminum alloy (JIS AC2C) to form a deposition layer of the Cu-base dispersion strengthened alloy. The structure of this Cu-base dispersion strengthened alloy layer having the overall composition, as specified above, is presented in FIG. 6. The depositing process used was that shown in FIG. 1. The depositing conditions were: the laser output of 2.8 KW; the laser beam diameter of 1.5 mm; the laser irradiation energy concentration of 1,600 W/mm$^2$; the laser beam oscillation width of 6 mm; the oscillation frequency of 200 Hz; the scanning rate (or metallic base moving velocity) of 750 mm/min; and the powder particle diameter of $-80$ to $+280$ meshes.

It has been confirmed that the Cu-base dispersion strengthened alloy layer formed had a structure in which hard particles (having a hardness of about 900 Hv) composed chiefly of the Fe-Ni silicides and partially of the Fe-Ni borides in a complex form and having an average particle diameter of 45 $\mu$m are uniformly dispersed in a volume content of about 7% in the Cu-base alloy matrix (having a hardness of about 220 Hv).

[EXAMPLE 2]

Figure 7:
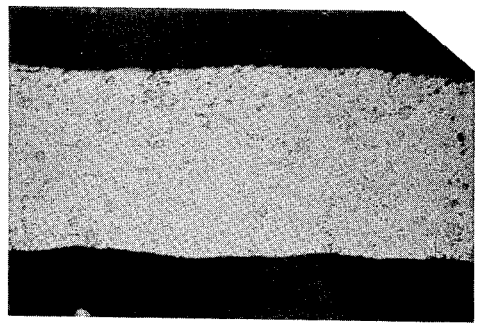

The powder mixture used was prepared by mixing 10% of alloy powder (having a particle diameter of $-80$ to $+350$ mesh) of Fe-Cr(40%) with alloy powder (having a particle diameter of $-80$ to $+280$ mesh) having a composition of Cu-Ni(15%)-Si(3%)-Al(1%)-B(2%). The mixture thus prepared was deposited on a metallic base of the aluminum alloy (JIS AC2C) by the process, as shown in FIG. 1, using the laser beam as a heat source, to form a deposited layer of the Cu-base dispersion strengthened alloy. The structure of this deposited layer is presented in FIG. 7. The conditions for this deposition were: the laser output of 3.0 KW; the laser beam diameter of 2.0 mm; the laser irradiation energy density of 950 W/mm$^2$; the laser beam oscillation width of 6 mm; the oscillation frequency of 200 Hz; and the scanning rate 600 mm/min.

It has been confirmed that the overall composition of the Cu-base dispersion strengthened alloy layer formed was Cu-Ni(1.35%)-Si(2.7%)-A (0.9%)-B(1.8%)-Fe(6%)-Cr(4%) and that the structure was such that hard particles composed chiefly of the Ni-Cr-Fe silicides and partially of the Ni-Cr-Fe borides in the complex form and having an average particle diameter of about 80 μm were uniformly dispersed in a volume content of about 9% in the Cu-base alloy matrix. The dispersion phase particles had a hardness of about 880 Hv, and the matrix had a hardness of about 280 Hv. For comparison, the material of Cu-Ni(15%)-Si(3%)-B(1.5%) having no addition of aluminum provides the matrix hardness of about 220 Hv. It is apparent from this comparison that the hardness of the matrix could be improved by the addition of aluminum.

[EXAMPLE 3]

Figure 8:
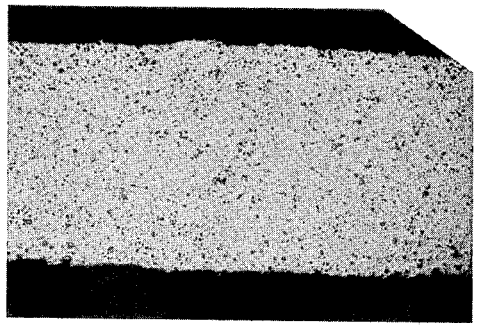

An alloy having a composition of Cu-Ni(15%)-Si(3%)-B(1.5%)-Fe(5%) was made into powder, after 0.7% of Ti had been added, to prepare alloy powder having a particle diameter of −80 to +280 mesh. The alloy powder thus prepared was deposited on a metallic base of the aluminum alloy (JIS AC2C) by the process of FIG. 1 using the laser beam as a heat source. The deposited layer, i.e., the Cu-base dispersion strengthened alloy layer had the structure presented in FIG. 8. The depositing conditions were: the laser output were 3.2 KW; the laser beam diameter of 3.0 mm; the laser irradiation energy concentration of 450 W/mm$^2$; the laser beam oscillation width of 6 mm; the oscillation frequency of 200 Hz; and the scanning rate of 750 mm/min.

In the Cu-base dispersion strengthened alloy layer formed, hard particles composed chiefly of the Fe-Ni-Ti silicides and partially of the Fe-Ni-Ti borides in a complex form and having an average particle diameter of 30 μm were uniformly dispersed in a volume content of about 7% in the Cu-base alloy matrix. The dispersion particles had the hardness of about 850 to 1,200 Hv, and the matrix had the hardness of about 260 Hv. These values reveal that the hardness of the matrix was higher than the value of about 220 Hv of the matrix of the material of Cu-Ni(15%)-Si(3%)-B(1.5%) to which no Ti was added.

[EXAMPLE 4]

Figure 9:
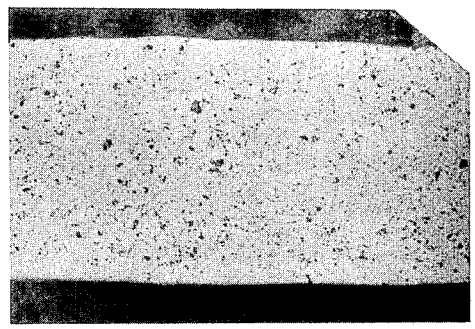

An alloy having a composition of Cu-Ni(15%)-Si(3%)-B(1.5%)-Fe(5%) was made into powder, after 7% of Mn had been added, to prepare alloy powder having a particle diameter of −80 to +280 mesh. The alloy powder thus prepared was deposited on a metallic base of the aluminum alloy (JIS AC2C) by the process of FIG. 1 using the laser beam as a heat source. The deposited layer, i.e., the Cu-base dispersion strengthened alloy layer had the structure presented in FIG. 9. The depositing conditions were: the laser output were 3.6 KW; the laser beam diameter of 3.0 mm; the laser irradiation energy concentration of 500 W/mm$^2$; the laser beam oscillation width of 6 mm; the oscillation frequency of 250 Hz; and the scanning rate of 600 mm/min.

In the Cu-base dispersion strengthened alloy layer formed, hard particles composed chiefly of the Fe-Ni silicides and partially of the Fe-Ni borides in a complex form and having an average particle diameter of 40 μm were uniformly dispersed in a volume content of about 4% in the Cu-base alloy matrix. The dispersion particles had the hardness of about 900 Hv, and the matrix had the hardness of about 320 Hv. These values reveal that the hardness of the matrix was far higher than the value of about 220 Hv of the matrix of the material of Ci-Ni(15%)-Si(3%)-B(1.5%) to which no Ti was added.

[EXAMPLE 5]

Figure 10:
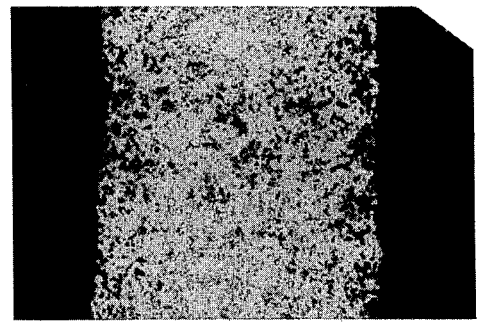

10 wt. % of powder (of −150 to +280 meshes) of Fe$_3$C (i.e., cementite) was mixed with powder (of −80 to +280 mesh) of an alloy having a composition of Cu-Ni(20%)-Si(3%)-B(1.5%)-Ti(0.5%). The powder mixture thus prepared was deposited on a metallic base of steel (S45C) by the process of FIG. 1 using the laser beam as a heat source to form a deposited layer of the Cu-base dispersion strengthened alloy, the structure of which is presented in FIG. 10. The depositing conditions were: the laser output of 3.2 KW; the laser beam irradiation energy concentration of 650 W/mm$^2$; the laser beam diameter of 2.5 mm; the laser beam oscillation width of 6 mm; the oscillation frequency of 200 Hz; and the scanning rate of 600 mm/min.

In the Cu-base dispersion strengthened alloy layer thus formed, both the particles (of a hardness of about 900 Hv) composed chiefly of the Fe-Ni nitrides and partially of the Fe-Ni borides in a complex form and the carbide particles (of a hardness of about 1,200 Hv) having an average particle diameter of 30 μm were dispersed in a total volume content of about 12% to have an average particle diameter of 72 μm in the Cu-base alloy matrix. The overall composition was Cu-Ni(18%)-Si(2.7%)-B(1.35%)-Ti(0.45%)-Fe(9.5%)-C(0.5%).

[Abrasion Tests]

Figure 11:
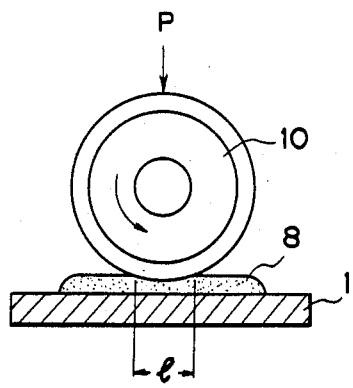
FIG. 11 is a schematic view illustrating the situation of the Ohgoshi type abrasion tester.

The individual Cu-base dispersion strengthened alloy layers formed in the foregoing Examples 1 to 5 were subjected to abrasion tests to examine their sliding wears by means of the Ohgoshi type abrasion tester, as shown in FIG. 11. In these tests, the width l of the wear dent was measured by rotating a rotor 10 of a hardened SKD material with the rotor 10 being pressed onto the dispersion alloy layer 8 on the metallic base 1. The measuring conditions were: the slip velocity of 0.3 m/sec; the slip distance of 100 m; and the final load of 10 Kg.

Figure 12:
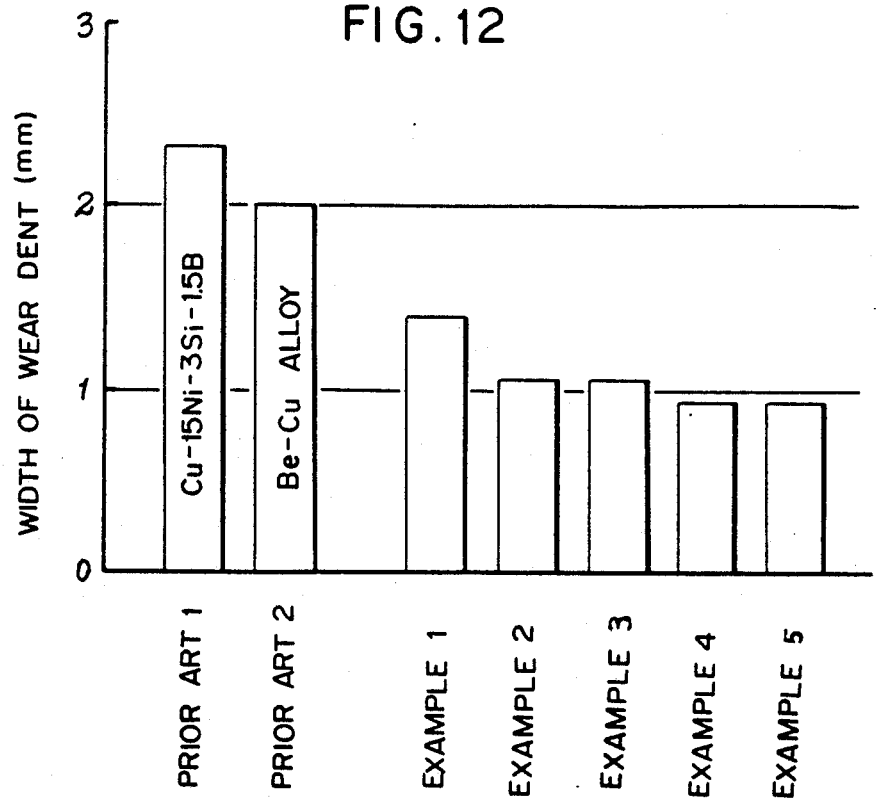
FIG. 12 is a graph plotting the results of the abrasion tests.

The results of the abrasion tests specified above are presented in FIG. 12 together with the results of wear resisting materials of the prior art such as an alloy of Cu-Ni(15%)-Si(3%)-B(1.5%) and a Be-Cu alloy (which were made by the conventional process).

As is apparent from FIG. 12, all of the Cu-base dispersion strengthened alloys of the individual Examples of the present invention had remarkably excellent wear resistances to sliding friction.

As is now apparent from the Examples thus far described, the Cu-base dispersion strengthened alloys of the present invention have excellent wear resistance, especially to sliding wear. Thus, the alloys can be suitably applied to members required to have high wear resistance. Since the alloys still have a high strength at a high temperature and a high thermal conductivity at the Cu-base, they are also effective as heat resisting materials at a temperature not exceeding 500° C. The Cu-base dispersion strengthened alloys of the invention can be formed by deposition on a selected metallic base made of an aluminum alloy or the like. Thus, the deposited layer of the alloys of the invention can be formed locally on such portions of a variety of large or small mechanical parts, required to have wear resistance. Thus, a necessary wear resistance can be given at will to the target portion without any deterioration of other characteristics of the entire member. In the Cu-base dispersion strengthened alloys of the present invention, moreover, the diameter of the hard dispersion phase particles can be changed to an optimum value according to the application intended and to the characteristics required.

What is claimed is:

1. A dispersion strengthened copper-base alloy having excellent wear resistance, said alloy consisting essentially of, in weight percent, 5 to 30% of nickel, 1 to 5% of silicon, 0.5 to 3% of boron and 4 to 30% of iron, the remainder being copper and unavoidable impurities; and having a structure in which hard particles composed chiefly of a silicide of an iron-nickel system are dispersed in a copper-base matrix.

2. A dispersion strengthened copper-base alloy according to claim 1, having at least one of 0.1 to 5% of aluminum, 0.1 to 5% of titanium, and 1 to 10% of manganese.

3. A dispersion strengthened copper-base alloy according to claim 1, having 0.02 to 2% of carbon, and at least one of 0.5 to 10% of chromium and 0.3 to 5% of titanium, wherein carbide particles are dispersed in said structure coexistently with said hard particles.

4. A dispersion strengthened copper-base alloy according to claim 1, wherein said hard particles are further composed of a boride of iron-nickel system in complex form with said silicide.

* * * * *